United States Patent
Yang et al.

(10) Patent No.: US 8,968,901 B2
(45) Date of Patent: *Mar. 3, 2015

(54) MIDDLE OR LARGE-SIZED BATTERY MODULE

(75) Inventors: Heekook Yang, Daejeon (KR); Jongmoon Yoon, Daejeon (KR); Jae Hun Yang, Daejeon (KR)

(73) Assignee: LG Chem, Ltd. (KR)

(*) Notice: Subject to any disclaimer, the term of this patent is extended or adjusted under 35 U.S.C. 154(b) by 260 days.

This patent is subject to a terminal disclaimer.

(21) Appl. No.: 12/986,426

(22) Filed: Jan. 7, 2011

(65) Prior Publication Data

US 2011/0135994 A1    Jun. 9, 2011

Related U.S. Application Data

(63) Continuation of application No. 12/224,688, filed as application No. PCT/KR2007/001017 on Feb. 28, 2007, now Pat. No. 7,892,669.

(30) Foreign Application Priority Data

Mar. 6, 2006  (KR) ................ 10-2006-0020772
May 22, 2006  (KR) ................ 10-2006-0045443

(51) Int. Cl.
*H01M 2/00*  (2006.01)
*H01M 2/10*  (2006.01)
(Continued)

(52) U.S. Cl.
CPC .......... *H01M 2/0212* (2013.01); *H01M 2/206* (2013.01); *H01M 10/486* (2013.01);
(Continued)

(58) Field of Classification Search
USPC ................ 429/61, 96, 98, 99, 100, 159, 176; 180/168.5, 68.5; 903/907, 952
See application file for complete search history.

(56) References Cited

U.S. PATENT DOCUMENTS 4,278,744 A    7/1981  Athearn
4,957,829 A    9/1990  Holl
(Continued)

FOREIGN PATENT DOCUMENTS

JP    10-129276 A    5/1998
JP    2003-123721 A    4/2003
(Continued)

OTHER PUBLICATIONS

U.S. Appl. No. 12/224,688.
(Continued)

*Primary Examiner* — Eugenia Wang
(74) *Attorney, Agent, or Firm* — Lerner, David, Littenberg, Krumholz & Mentlik, LLP

(57) ABSTRACT

Disclosed herein is a middle- or large-sized battery module comprising: a battery cell stack including a plurality of battery cells or unit modules electrically connected with each other; a first module case constructed in a structure to entirely surround one side end of the battery cell stack and to partially surround the upper and lower ends of the battery cell stack; a second module case coupled with the first module case, the second module case being constructed in a structure to entirely surround the other side end of the battery cell stack and to partially surround the upper and lower ends of the battery cell stack; a sensing member mounted to the first module case or the second module case; and a battery management system (BMS) mounted to the first module case or the second module case.

17 Claims, 12 Drawing Sheets

(51) Int. Cl.
    *H01M 2/04*     (2006.01)
    *B60T 7/16*     (2006.01)
    *B62D 1/24*     (2006.01)
    *H01M 2/20*     (2006.01)
    *H01M 10/48*    (2006.01)
    *H01M 2/02*     (2006.01)

(52) U.S. Cl.
    CPC ............ *H01M10/48* (2013.01); *H01M 2/0275* (2013.01); *H01M 2/1077* (2013.01); *H01M 2/1061* (2013.01)
    USPC ................... 429/99; 429/61; 429/96; 429/98; 429/100; 429/159; 429/176; 180/68.5

(56) References Cited

U.S. PATENT DOCUMENTS

| | | | |
|---|---|---|---|
| 5,437,939 | A | 8/1995 | Beckley |
| 5,510,203 | A | 4/1996 | Hamada et al. |
| 5,558,950 | A | 9/1996 | Ovshinsky et al. |
| 5,639,571 | A | 6/1997 | Waters et al. |
| 6,304,057 | B1 | 10/2001 | Hamada et al. |
| 6,379,837 | B1 | 4/2002 | Takahashi et al. |
| 6,410,184 | B1 | 6/2002 | Horiuchi et al. |
| 6,569,561 | B1 | 5/2003 | Kimura et al. |
| 6,818,343 | B1 | 11/2004 | Kimoto et al. |
| 6,896,995 | B2* | 5/2005 | Saito ............................ 429/163 |
| 7,892,669 | B2* | 2/2011 | Yang et al. ................... 429/100 |
| 2002/0009649 | A1 | 1/2002 | Sato et al. |
| 2002/0182480 | A1 | 12/2002 | Hanauer et al. |
| 2003/0215702 | A1 | 11/2003 | Tanjou et al. |
| 2004/0021442 | A1 | 2/2004 | Higashino |
| 2004/0033415 | A1* | 2/2004 | Chen et al. ..................... 429/99 |
| 2004/0036444 | A1 | 2/2004 | Oogami |
| 2004/0050414 | A1* | 3/2004 | Oogami ........................ 136/249 |
| 2004/0055922 | A1 | 3/2004 | Ordonez |
| 2004/0119442 | A1 | 6/2004 | Lee et al. |
| 2005/0031946 | A1 | 2/2005 | Kruger et al. |
| 2005/0089751 | A1 | 4/2005 | Oogami et al. |
| 2005/0100783 | A1 | 5/2005 | Ro et al. |
| 2005/0110460 | A1 | 5/2005 | Arai et al. |
| 2005/0215296 | A1 | 9/2005 | Fujihara et al. |
| 2006/0040173 | A1* | 2/2006 | Shimamura et al. ............ 429/99 |
| 2006/0061330 | A1 | 3/2006 | Sato et al. |
| 2006/0093899 | A1 | 5/2006 | Jeon et al. |
| 2006/0176014 | A1 | 8/2006 | Moon |
| 2006/0177734 | A1 | 8/2006 | Yao |
| 2006/0183017 | A1 | 8/2006 | Kanai |

FOREIGN PATENT DOCUMENTS

| | | |
|---|---|---|
| JP | 2005-108693 | 4/2005 |
| JP | 2005-209365 A2 | 8/2005 |
| JP | 2005-222701 A | 8/2005 |
| KR | 20060047061 A | 5/2006 |
| WO | 2005/074054 A1 | 8/2005 |
| WO | 2007079449 A2 | 7/2007 |
| WO | 2007091757 A1 | 8/2007 |

OTHER PUBLICATIONS

U.S. Appl. No. 12/224,687.
U.S. Appl. No. 12/224,526.
U.S. Appl. No. 12/224,689.

* cited by examiner

Prior Art

MIDDLE OR LARGE-SIZED BATTERY MODULE

CROSS-REFERENCE TO RELATED APPLICATIONS

The present application is a continuation of U.S. application Ser. No. 12/224,688, now U.S. Pat. No. 7,892,669, filed Apr. 10, 2009, which is a national phase entry under 35 U.S.C. §371 of International Application No. PCT/KR2007/001017 filed Feb. 28, 2007, published in English, which claims priority from Korean Patent Application Nos. 10-2006-00020772, filed Mar. 6, 2006 and 10-2006-0045443, filed May 22, 2006, the disclosures of which are incorporated herein by reference.

FIELD OF THE INVENTION

The present invention relates to a middle- or large-sized battery module, and, more particularly, to a middle- or large-sized battery module comprising: a battery cell stack including a plurality of battery cells or unit modules electrically connected with each other, the battery cells or unit modules being erected in the lateral direction; a first module case constructed in a structure to entirely surround one side end of the battery cell stack and to partially surround the upper and lower ends of the battery cell stack, the first module case being provided at the front part thereof with external input and output terminals; a second module case coupled with the first module case, the second module case being constructed in a structure to entirely surround the other side end of the battery cell stack and to partially surround the upper and lower ends of the battery cell stack, the second module case being provided at the front part thereof with bus bars for connecting electrode terminals of the battery cell stack to the external input and output terminals; a sensing member mounted to the first module case or the second module case; and a battery management system (BMS) mounted to the first module case or the second module case, while being connected to the sensing member, for monitoring and controlling the operation of the battery module.

BACKGROUND OF THE INVENTION

Recently, a secondary battery, which can be charged and discharged, has been widely used as an energy source for wireless mobile devices. Also, the secondary battery has attracted considerable attention as an energy source for electric vehicles (EV) and hybrid electric vehicles (HEV), which have been developed to solve problems, such as air pollution, caused by existing gasoline and diesel vehicles using fossil fuel.

Small-sized mobile devices use one or several small-sized battery cells for each device. On the other hand, middle- or large-sized devices, such as vehicles, use a middle- or large-sized battery module having a plurality of battery cells electrically connected with each other because high output and large capacity are necessary for the middle- or large-sized devices.

Preferably, the middle- or large-sized battery module is manufactured with small size and small weight if possible. For this reason, a prismatic battery or a pouch-shaped battery, which can be stacked with high integration and has a small weight to capacity ratio, is usually used as a battery cell of the middle- or large-sized battery module. Especially, much interest is currently generated in the pouch-shaped battery, which uses an aluminum laminate sheet as a sheathing member, because the weight of the pouch-shaped battery is small and the manufacturing costs of the pouch-shaped battery are low.

FIG. 1 is a perspective view typically illustrating a conventional representative pouch-shaped battery. The pouch-shaped battery 100 shown in FIG. 1 is constructed in a structure in which two electrode leads 110 and 120 protrude from the upper and lower ends of a battery body 130, respectively, while the electrode leads 110 and 120 are opposite to each other. A sheathing member 140 comprises upper and lower sheathing parts. That is, the sheathing member 140 is a two-unit member. An electrode assembly (not shown) is received in a receiving part which is defined between the upper and lower sheathing parts of the sheathing member 140. The opposite sides 140a and the upper and lower ends 140b and 140c, which are contact regions of the upper and lower sheathing parts of the sheathing member 140, are bonded to each other, whereby the pouch-shaped battery 100 is manufactured. The sheathing member 140 is constructed in a laminate structure of a resin layer/a metal film layer/a resin layer. Consequently, it is possible to bond the opposite sides 140a and the upper and lower ends 140b and 140c of the upper and lower sheathing parts of the sheathing member 140, which are in contact with each other, to each other by applying heat and pressure to the opposite sides 140a and the upper and lower ends 140b and 140c of the upper and lower sheathing parts of the sheathing member 140 so as to weld the resin layers thereof to each other. According to circumstances, the opposite sides 140a and the upper and lower ends 140b and 140c of the upper and lower sheathing parts of the sheathing member 140 may be bonded to each other using a bonding agent. For the opposite sides 140a of the sheathing member 140, the same resin layers of the upper and lower sheathing parts of the sheathing member 140 are in direct contact with each other, whereby uniform sealing at the opposite sides 140a of the sheathing member 140 is accomplished by welding. For the upper and lower ends 140b and 140c of the sheathing member 140, on the other hand, the electrode leads 110 and 120 protrude from the upper and lower ends 140b and 140c of the sheathing member 140, respectively. For this reason, the upper and lower ends 140b and 140c of the upper and lower sheathing parts of the sheathing member 140 are thermally welded to each other, while a film-shaped sealing member 160 is interposed between the electrode leads 110 and 120 and the sheathing member 140, in consideration of the thickness of the electrode leads 110 and 120 and the difference in material between the electrode leads 110 and 120 and the sheathing member 140, so as to increase sealability of the sheathing member 140.

However, the mechanical strength of the sheathing member 140 is low. In order to solve this problem, there has been proposed a method of mounting battery cells (unit cells) in a pack case, such as a cartridge, so as to manufacture a battery module having a stable structure. However, a device or a vehicle, in which a middle- or large-sized battery module is installed, has a limited installation space. Consequently, when the size of the battery module is increased due to the use of the pack case, such as the cartridge, the spatial utilization is lowered. Also, due to the low mechanical strength, the battery cells repeatedly expand and contract during the charge and the discharge of the battery cells. As a result, the thermally welded regions of the sheathing member may be easily separated from each other.

Also, when a middle- or large-sized battery module is constructed using a plurality of battery cells or a plurality of unit modules each of which includes a predetermined number of battery cells, a plurality of members for mechanical coupling and electrical connection between the battery cells or the unit modules are needed, and a process for assembling the mechanical coupling and electrical connection members is very complicated. Furthermore, there is needed a space for coupling, welding, or soldering the mechanical coupling and electrical connection members with the result that the total size of the system is increased. The increase in size of the system is not preferred in consideration of the spatial limit of an apparatus or device in which the middle- or large-sized battery module is mounted.

In this connection, there have been proposed several middle- or large-sized battery modules manufactured by simplified assembly processes. For example, Japanese Patent Application Publication No. 2005-209365 discloses a battery module including a center frame to which battery cells are individually mounted and terminal-side and bottom-side frames coupled respectively to the lower and upper ends of the center frame while the battery cells are mounted to the center frame. The disclosed battery module has an advantage in that the assembly of the battery module is easy. However, only the central parts of the battery cells are fixed to the center frame with the result that it is difficult to restrain the contraction and expansion of the battery cells during the repetitive charge and discharge of the battery cells, and therefore, it is limited to use pouch-shaped battery cells without modifying the battery cells. In addition, there is needed a process for connecting electrode terminals of the battery cells to a circuit board so as to accomplish the electrical connection between the battery cells. Furthermore, the size of the battery module is inevitably increased due to the provision of the center frame.

Also, Japanese Patent Application Publication No. 2003-123721 discloses a battery module constructed in a structure in which a prismatic battery cell stack is fixed to an upper-side case, a lower-side case, and a pair of end plates. However, the disclosed battery module has several problems in that the battery cells are fixed while being in tight contact with each other with the result that the heat dissipation is not easily accomplished, it is structurally difficult to use pouch-shaped battery cells in the battery module, and an additional member for interconnecting the end plates is needed.

Meanwhile, since a battery module is a structural body including a plurality of battery cells which are combined with each other, the safety and the operating efficiency of the battery module are lowered when overvoltage, overcurrent, and overheat occurs in some of the battery cells. Consequently, a sensing unit for sensing the overvoltage, overcurrent, and overheat are needed. Specifically, voltage and temperature sensors are connected to the battery cells so as to sense and control the operation of the battery cells in real time or at predetermined time intervals. However, the attachment or the connection of the sensing unit complicates the assembly process of the battery module. In addition, short circuits may occur due to the provision of a plurality of wires necessary for the attachment or the connection of the sensing unit.

Consequently, there is high necessity for a middle- or large-sized battery module that is compact and structurally stable, as described above, and, in addition, allows the sensing unit to be mounted thereto in a simple structure.

SUMMARY OF THE INVENTION

Therefore, the present invention has been made to solve the above problems, and other technical problems that have yet to be resolved.

Specifically, it is an object of the present invention to provide a middle- or large-sized battery module to which a sensing unit that is capable of minimizing the weight and size of battery cells while effectively reinforcing the low mechanical strength of the battery cells and sensing the operation state of the battery cells is easily mounted.

It is another object of the present invention to provide a middle- or large-sized battery module that is manufactured by a simple assembly process without using a plurality of members for mechanical coupling and electrical connection, whereby the manufacturing costs of the middle- or large-sized battery module are lowered, and that is effectively prevented from being short-circuited or damaged during the manufacture or the operation of the middle- or large-sized battery module.

It is a further object of the present invention to provide a middle- or large-sized battery system that is manufactured using the middle- or large-sized battery module as a unit body such that the middle- or large-sized battery system has desired output and capacity.

In accordance with one aspect of the present invention, the above and other objects can be accomplished by the provision of a middle- or large-sized battery module comprising: a battery cell stack including a plurality of battery cells or unit modules electrically connected with each other, the battery cells or unit modules being erected in the lateral direction; a first module case constructed in a structure to entirely surround one side end of the battery cell stack and to partially surround the upper and lower ends of the battery cell stack, the first module case being provided at the front part thereof with external input and output terminals; a second module case coupled with the first module case, the second module case being constructed in a structure to entirely surround the other side end of the battery cell stack and to partially surround the upper and lower ends of the battery cell stack, the second module case being provided at the front part thereof with bus bars for connecting electrode terminals of the battery cell stack to the external input and output terminals; a sensing member mounted to the first module case or the second module case; and a battery management system (BMS) mounted to the first module case or the second module case, while being connected to the sensing member, for monitoring and controlling the operation of the battery module.

In the middle- or large-sized battery module according to the present invention, the battery cell stack is fixed to the first and second module cases, and the sensing member and the BMS are mounted on the module cases. Consequently, a process for assembling the battery module is simple, and the battery module is constructed in a simple and compact structure.

In a preferred embodiment, the middle- or large-sized battery module comprises:

(a) a battery cell stack including a plurality of battery cells or unit modules connected in series with each other, the battery cells or unit modules being erected in the lateral direction;

(b) an upper case constructed in a structure to entirely surround one side end of the battery cell stack and to partially surround the upper and lower ends of the battery cell stack, the upper case being provided at the front part thereof with external input and output terminals;

(c) a lower case coupled with the first module case, the second module case being constructed in a structure to entirely surround the other side end of the battery cell stack and to partially surround the upper and lower ends of the battery cell stack, the lower case being provided at the front part thereof with bus bars for connecting electrode terminals of the battery cell stack to the external input and output terminals;

(d) a sensing member including sensing parts mounted in spaces defined on the front and rear parts of the lower case and a conduction part for interconnecting the sensing parts;

(e) a front cover mounted to the front part of the lower case for protecting connections between the electrode terminals of the battery cells and the bus bars from the outside, the front cover being made of an insulative material; and (f) a battery management system (BMS) mounted to the rear part of the lower case, while being connected to the sensing member, for monitoring and controlling the operation of the battery module.

As described above, the battery cell stack is mounted in the cases in such a manner that the plurality of battery cells or unit modules are erected in lateral direction. In the specification, regions of the battery cells or the unit modules where the electrode terminals of the battery cells or the unit modules protrude are defined as front and rear directions, and the opposite side edges of the battery cells or the unit modules are defined as a lateral direction. Consequently, the battery cell stack is constructed in a structure in which the battery cells or the unit modules are erected such that one of the side edges of the battery cells or the unit modules is erected with respect to the ground while the electrode terminals of the battery cells or the unit modules are oriented in the front and rear directions of the battery module.

Preferably, the battery cell stack comprises a plurality of unit modules each including plate-shaped battery cells having electrode terminals formed at the upper and lower ends thereof. Each unit module comprises two or more battery cells constructed in a stacked structure in which electrode terminals of the battery cells are connected in series with each other and the electrode terminal connections are bent such that the battery cells are stacked, and a pair of high-strength cell covers for surrounding the outer surfaces of the battery cells excluding the electrode terminals of the battery cells when the cell covers are coupled with each other.

The plate-shaped battery cells are secondary batteries having a small thickness and a relatively large width and length, such that the total size of the secondary batteries is minimized when the secondary batteries are stacked to construct a battery module. In a preferred embodiment, each plate-shaped battery cell is a secondary battery constructed in a structure in which an electrode assembly is mounted in a battery case made of a laminate sheet including a resin layer and a metal layer, and electrode terminals protrude from upper and lower ends of the battery case. Specifically, each battery cell is constructed in a structure in which the electrode assembly is mounted in a pouch-shaped battery case made of an aluminum laminate sheet. Hereinafter, the secondary battery with the above-stated construction will be referred to as a pouch-shaped battery cell.

The case of the pouch-shaped battery cell may be constructed in various structures. For example, the case of the pouch-shaped battery may be constructed in a structure in which the electrode assembly is received in a receiving part formed at the upper inner surface and/or the lower inner surface of a two-unit member, and the upper and lower contact regions are sealed.

The electrode assembly comprises cathodes and anodes, by which the charge and the discharge of the battery are possible. The electrode assembly may be constructed in a structure in which the cathodes and the anodes are stacked while separators are disposed respectively between the cathodes and the anodes. For example, the electrode assembly may be constructed in a jelly-roll type structure, a stacking type structure, or a stacking/folding type structure. The cathodes and the anodes of the electrode assembly may be constructed such that electrode taps of the cathodes and electrode taps of the anodes directly protrude outward from the battery. Alternatively, the cathodes and the anodes of the electrode assembly may be constructed such that the electrode taps of the cathodes and the electrode taps of the anodes are connected to additional leads, and the leads protrude outward from the battery.

The battery cells are surrounded, one by one or two by two, by the high-strength cell covers made of synthetic resin or metal so as to constitute a unit module. The high-strength cell covers restrain the repetitive expansion and contraction change of the battery cells during the charge and discharge of the battery cells while protecting the battery cells having low mechanical strength, thereby preventing separation between sealing regions of the battery cells. Consequently, it is possible to manufacture a middle- or large-sized battery module having further improved safety.

The battery cells are connected in series and/or parallel with each other in one unit module, or the battery cells of one unit module are connected in series and/or parallel with the battery cells of another unit module. In the preferred embodiment as described above, a plurality of unit modules are manufactured by coupling electrode terminals of the battery cells to each other, while arranging the battery cells in series in the longitudinal direction, such that the electrode terminals of the battery cells are successively adjacent to each other, bending the battery cells by twos or more such that the battery cells are stacked while being in tight contact with each other, and surrounding the stacked battery cells by predetermined numbers with the cell covers.

The coupling between the electrode terminals is accomplished in various manners, such as welding, soldering, and mechanical coupling. Preferably, the coupling between the electrode terminals is accomplished by welding.

The battery cell stack, in which the battery cells are stacked in high integration while the electrode terminals of the battery cells are connected with each other, is vertically mounted in the separable upper and lower cases that are coupled with each other in the assembly-type coupling structure.

Preferably, the upper and lower cases are constructed in a structure to surround the edge of the battery cell stack and expose the outer surfaces of the battery cell stack to the outside so as to accomplish easy heat dissipation of the battery cell stack when the upper and lower cases are coupled with each other after the battery cell stack is mounted in the upper and lower cases. Consequently, as described above, the upper case is constructed in a structure to entirely surround one side end of the battery cell stack and to partially surround the upper and lower ends of the battery cell stack, and the lower case is constructed in a structure to entirely surround the other side end of the battery cell stack and to partially surround the upper and lower ends of the battery cell stack.

In a preferred embodiment, the upper and lower cases are provided in the insides thereof with pluralities of mounting grooves in which the edges of the battery cells or the unit modules are inserted.

When the battery cell stack includes a plurality of unit modules, the cell covers of the unit modules are provided at the outer surfaces adjacent to the upper and lower ends thereof with steps of a predetermined size for easily fixing the unit modules, and the cell covers are provided at the outer surfaces adjacent to the opposite sides thereof with steps of a predetermined size for easily fixing the unit modules, such that the battery cell stack is stably mounted to the cases and the unit modules are stacked while being in tighter contact with each other, whereby the overall size of the battery cell stack is reduced. The mounting grooves of the upper and lower cases are constructed in a structure corresponding to the steps.

Consequently, the steps formed adjacent to the edges of the unit modules are inserted in the mounting grooves of the upper and lower cases, whereby a very stable coupling structure is formed even though only the edges of the unit modules are fixed to the cases.

Preferably, the lower case is provided at the insides of the front and rear parts thereof with pluralities of fixing grooves in which the electrode terminal connections of the battery cells are inserted. Consequently, it is possible to prevent the battery cell stack from moving forward and rearward and to maintain stable insulation between the neighboring electrode terminal connections.

Preferably, the lower case is provided at the front part thereof with a pair of slits through which the outermost electrode terminals of the battery cell stack are inserted. When the battery cell stack is mounted to the lower case, the outermost electrode terminals of the battery cell stack are exposed through the slits and then bent such that the outermost electrode terminals of the battery cell stack are brought into tight contact with the front part of the lower case. Consequently, the outermost electrode terminals of the battery cell stack are more easily connected to the bus bars located at the front part of the lower case.

According to circumstances, a conductive member may be further mounted to at least one of the external input and output terminals for fixing the upper end of the front cover and assisting with the connection of a power cable necessary for electrical connection. Each conductive member may include bent parts for elastically surrounding the power cable. In addition, the front cover may be provided with holes for fixing the power cable. Insulative coupling members are inserted through the corresponding fixing holes such that the insulative coupling members are coupled with some of the power cable.

Preferably, the front cover is coupled to the lower case in an assembly coupling fashion.

The upper and lower cases are coupled with each other by mounting the battery cell stack to one of the upper and lower cases (for example, the lower case) and coupling the other case (for example, the upper case) to the frame member in which the battery cell stack is mounted. The coupling between the upper and lower cases may be accomplished in various manners. For example, screws may be threadedly inserted into thread grooves formed at the opposite sides of the cases. Alternatively, a hook may be formed at one of the cases, and a coupling hole corresponding to the hook may be formed in the other case, whereby the coupling between the upper and lower cases is accomplished without using an additional coupling member.

Preferably, the lower case is provided at the lower end of the front and/or rear part thereof with a coupling part which protrudes from the lower case and has a through-hole in the center thereof such that the lower case is fixed to an external device.

More preferably, the coupling part formed at the lower end of the front or rear part of the lower case includes a pair of protruding coupling parts constructed such that one of the protruding coupling parts is higher by a height equivalent to the thickness of the other protruding coupling part than the other protruding coupling part. Consequently, when a middle- or large-sized battery system is manufactured using a plurality of battery modules, it is possible to easily accomplish the coupling between the battery modules and to construct the battery system in a compact structure.

In a battery module including a plurality of battery cells, on the other hand, it is necessary to measure and control the voltage and temperature of the battery cells in consideration of the safety and operational efficiency of the battery module. Especially, it is necessary to measure the voltage of the respective battery cells or the respective electrical connection regions of the battery cells. For this reason, the attachment of a sensing member for measuring the voltage or temperature of the battery cells is one of the principal factors further complicating the construction of the battery module.

The above-mentioned problem may be solved by the provision of a sensing member mounted along one of the cases, i.e., the upper case or the lower case, for sensing the voltage and/or temperature of the battery cells in accordance with the present invention. Specifically, as described above, the sensing member includes sensing parts mounted in spaces defined on the front and rear parts of the lower case and a conduction part for interconnecting the sensing parts. The sensing member may be a voltage sensing member and/or a temperature sensing member.

In a preferred embodiment, the sensing parts of the voltage sensing member are mounted in the front and rear parts of the lower case. The sensing parts mounted in the rear part of the lower case may be directly connected to the BMS mounted to the rear part of the lower case, and the sensing parts mounted in the front part of the lower case may be connected to the BMS via the conduction part mounted to the bottom of the lower case.

In another preferred embodiment, the sensing member includes thermistors mounted to the battery cells or unit modules of the battery cell stack. The thermistors are connected to the BMS.

On the other hand, the lower case may be provided at the rear part thereof with a protruding BMS receiving part in which the BMS is integrally assembled, preferably the BMS is received. The BMS receiving part may be provided with a thermistor connector and a communication connector.

When a plurality of battery modules are used to construct a middle- or large-sized battery system, as described above, BMSs mounted to the respective battery modules may be said to be 'slave BMSs.'

The middle- or large-sized battery module according to the present invention is constructed in a compact structure, and the mechanical coupling and electrical connection of the middle- or large-sized battery module are stably accomplished without using a plurality of members. Also, it is possible to construct a battery module using a predetermined number of battery cells, for example, four, six, eight, or ten battery cells, thereby effectively mounting a necessary number of battery modules in a limited space.

In accordance with another aspect of the present invention, there is provided a middle- or large-sized battery system having high output and large capacity, the battery system being constructed by connecting a plurality of battery modules.

The middle- or large-sized battery system according to the present invention may be manufactured by combining unit modules based on desired output and capacity. The battery system according to the present invention is preferably used in all kinds of devices using electric power, such as electric vehicles, hybrid electric vehicles, electric motorcycles, and electric bicycles, which have a limit installation space and are exposed to frequent vibration and strong impact in consideration of the installation efficiency and structural stability of the battery system.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 2:
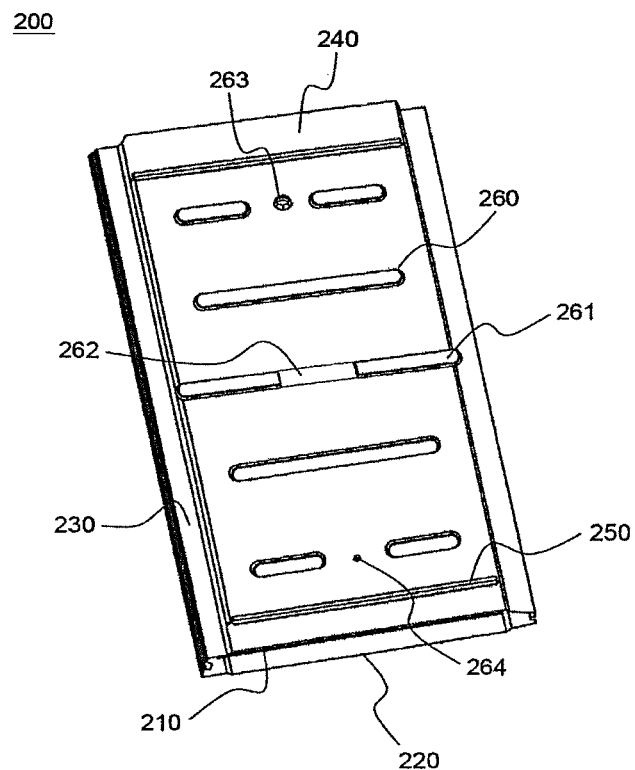
FIG. 2 is a perspective view illustrating a cell cover constituting a unit module according to a preferred embodiment of the present invention.

FIG. 2 is a perspective view illustrating a cell cover constituting a unit module according to a preferred embodiment of the present invention.

Figure 1:
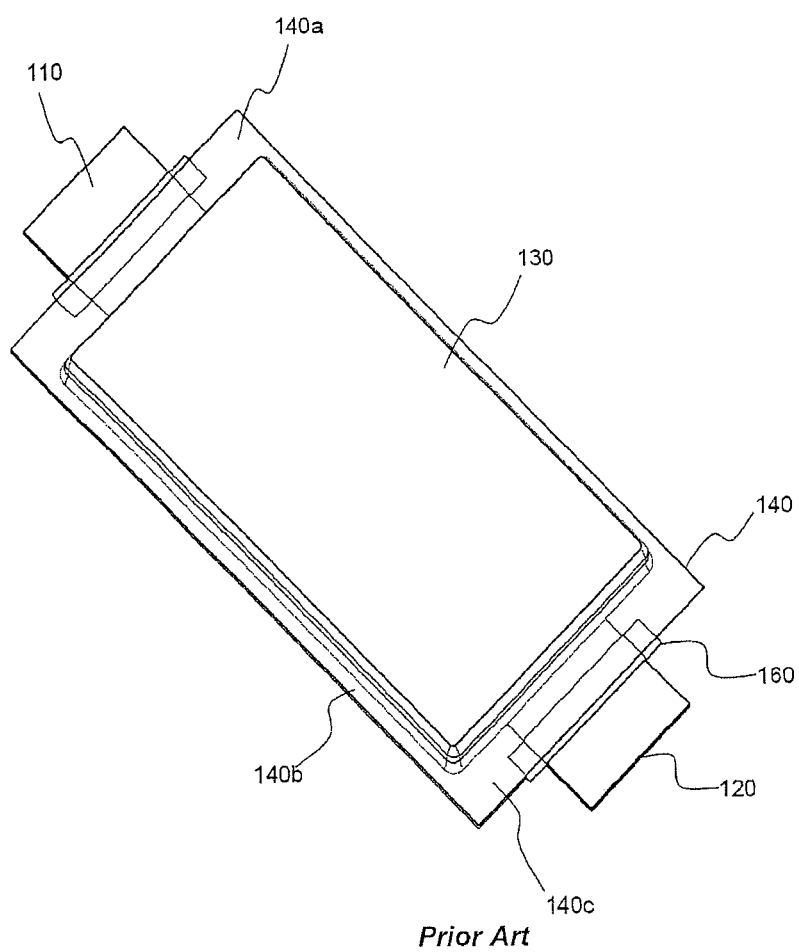
FIG. 1 is a perspective view illustrating a conventional representative pouch-shaped battery.

Referring to FIG. 2, the cell cover 200 serves to supplement the mechanical strength of two pouch-shaped battery cells, one of which is illustrated in FIG. 1, by mounting the battery cells therein and to allowing the battery cells to be easily mounted to a module case (not shown). The two battery cells are bent while one-side electrode terminals of the battery cells are connected in series with each other, and are then mounted in the cell cover 200 while the battery cells are in tight contact with each other.

The cell cover 200 includes a pair of cover members 210 and 220 which are coupled with each other. The cover members 210 and 220 are made of a high-strength metal sheet. At the opposite sides of the cell cover 200 are formed steps 230, by which the module is easily fixed. At the upper and lower ends of the cell cover 200 are also formed steps 240 having the same function as the steps 230. In addition, fixing parts 250 are formed at the upper and lower ends of the cell cover 200 such that the fixing parts 250 extend in the lateral direction. The cell cover 200 is easily mounted to the module case by the provision of the fixing parts 250.

The cell cover 200 is provided at the outer surface thereof with a plurality of linear protrusions 260 which are spaced apart from each other in the longitudinal direction. A protrusion 261 formed at the middle of the cell cover has a depression 262, in which a thermistor (not shown) is mounted. Among the linear protrusions 260, the upper-end and lower-end protrusions have projection parts 263 and 264 formed in opposite shapes.

Figure 3:
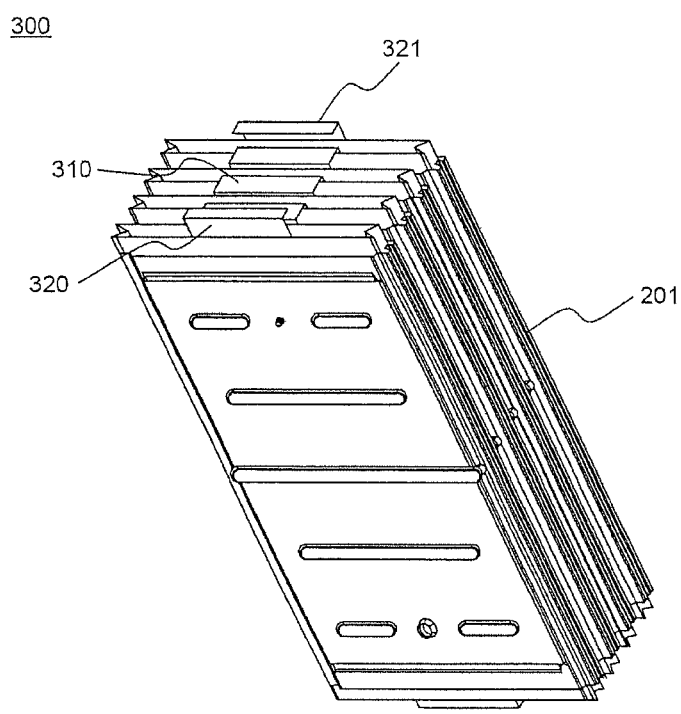
FIG. 3 is a perspective view illustrating a battery cell stack including a plurality of unit modules.

FIG. 3 is a perspective view illustrating a battery cell stack 300 including a plurality of unit modules.

Referring to FIG. 3, the battery cell stack 300 includes four unit modules 201. Two battery cells (not shown) are mounted in each unit module 201. Consequently, a total of eight battery cells are included in the battery cell stack 300. Electrode terminals of the neighboring battery cells are connected in series with each other, and electrode terminals of the neighboring unit modules are also connected in series with each other. Electrode terminal connections 310 are bent in the sectional shape of a '[' to construct the battery cell stack. Outside electrode terminals 320 and 321 of the outermost unit modules 201 are bent inward in the sectional shape of a '┐' such that the electrode terminals 320 and 321 protrude slightly more than the electrode terminal connections 310.

Figure 4:
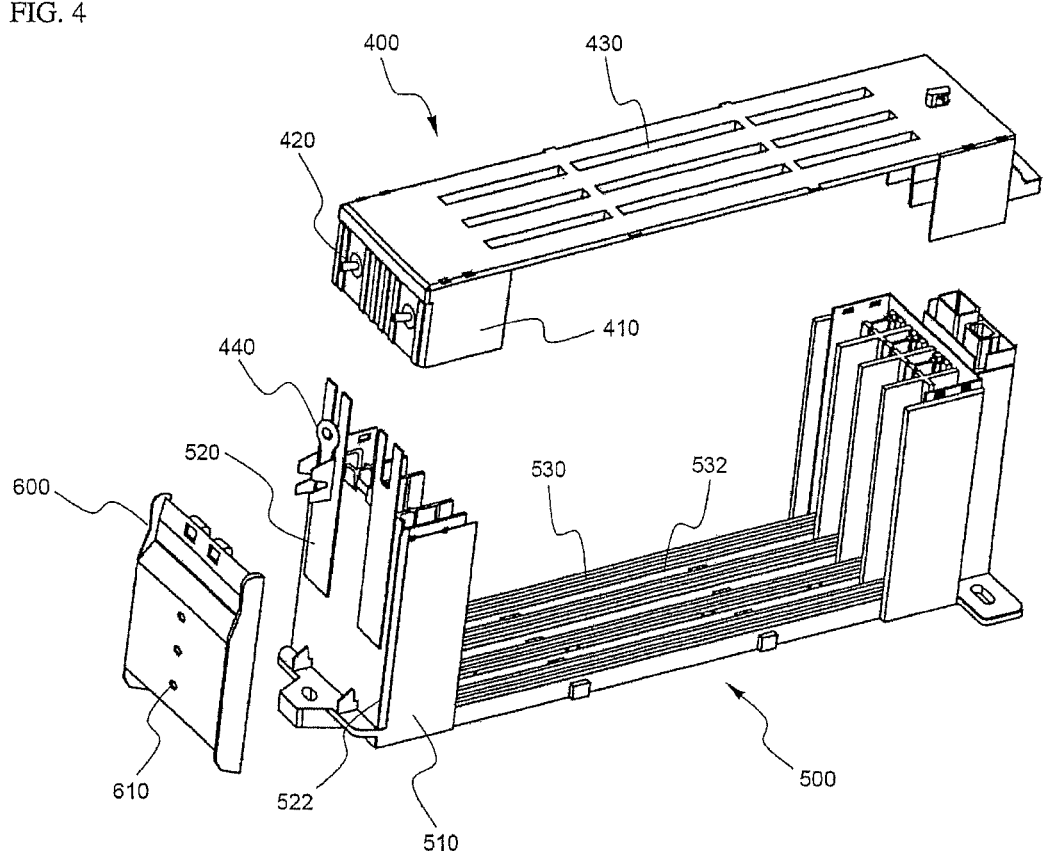
FIG. 4 is an exploded perspective view illustrating upper and lower cases and a front cover of a middle- or large-sized battery module according to a preferred embodiment of the present invention.

FIG. 4 is an exploded perspective view illustrating upper and lower cases and a front cover of a middle- or large-sized battery module according to a preferred embodiment of the present invention.

Referring to FIG. 4, the upper case 400 is constructed in a structure to entirely surround one side end of the battery cell stack as shown in FIG. 3 and to partially surround the upper and lower ends of the battery cell stack. The upper case 400 is provided at the front part 410 thereof with a pair of external input and output terminals 420.

The lower case 500 is constructed in a structure to entirely surround the other side end of the battery cell stack and to partially surround the upper and lower ends of the battery cell stack. The lower case 500 is coupled with the upper case 400. The lower case 500 is provided at the front part 510 thereof with a pair of bus bars 520 for connecting electrode terminals of the battery cell stack to the external input and output terminals 420. Specifically, the upper and lower cases 400 and 500 are constructed in a structure in which, when the upper and lower cases 400 and 500 are coupled with each other, the upper and lower cases 400 and 500 surround only the edge of the battery cell stack (not shown), such that the outer surface of the battery cell stack is exposed to the outside, so as to accomplish easy heat dissipation of the battery cell stack.

The upper end of each bus bar 520 is formed in the shape of a depression such that the external input and output terminals 420 provided at the front part 410 of the upper case 400 are inserted into the depressions of the bus bars 520 when the upper and lower cases 400 and 500 are coupled with each other.

In the insides of the upper case 400 and the lower case 500 are formed pluralities of mounting grooves 530 in which the edges of the battery cells or the unit modules are inserted. The mounting grooves 530 are constructed in a structure in which the steps of the unit modules as shown in FIG. 2 are fitted in the corresponding mounting grooves 530.

Also, the upper case 400 and the lower case 500 are provided with pluralities of through-holes 430 and 532, through which a coolant (normally, air) flows, respectively, whereby effective cooling is accomplished while the battery cell stack is mounted in the upper case 400 and the lower case 500.

To the front part 510 of the lower case 500 is mounted a front cover 600 for protecting connections between the electrode terminals of the battery cells and the bus bars from the outside. The front cover 600 is made of an insulative material.

To the external input and output terminals 420 are further mounted conductive members 440 for fixing the upper end of the front cover 600 and assisting with the connection of a power cable (not shown) necessary for electrical connection.

For easy understanding, the conductive members 440 are shown to be separated from the external input and output terminals 420 and located in front of the bus bars 520 in the drawing. Each conductive member 440 is provided at one side thereof with a coupling insertion hole through which the corresponding external input and output terminal 420 is inserted. Also, each conductive member 440 includes a pair of bent parts for elastically surrounding the power cable.

The front cover 600 is provided with fixing holes 610 for fixing the power cable. Insulative coupling members (not shown) are inserted through the corresponding fixing holes 610 such that the insulative coupling members are coupled with some of the power cable.

The lower case 500 is provided at the front part 510 thereof with a pair of slits 522 which are formed at the right and left sides of the front part 510 of the lower case 500 such that the outermost electrode terminals (not shown) of the battery cell stack are inserted through the corresponding slits 522. When the battery cell stack is mounted to the lower case 500, the outermost electrode terminals of the battery cell stack are exposed through the slits 522 and then bent such that the outermost electrode terminals of the battery cell stack are brought into tight contact with the front part 510 of the lower case 500. Consequently, the outermost electrode terminals of the battery cell stack are more easily connected to the bus bars 520 located at the front part 510 of the lower case 500.

Figure 5:
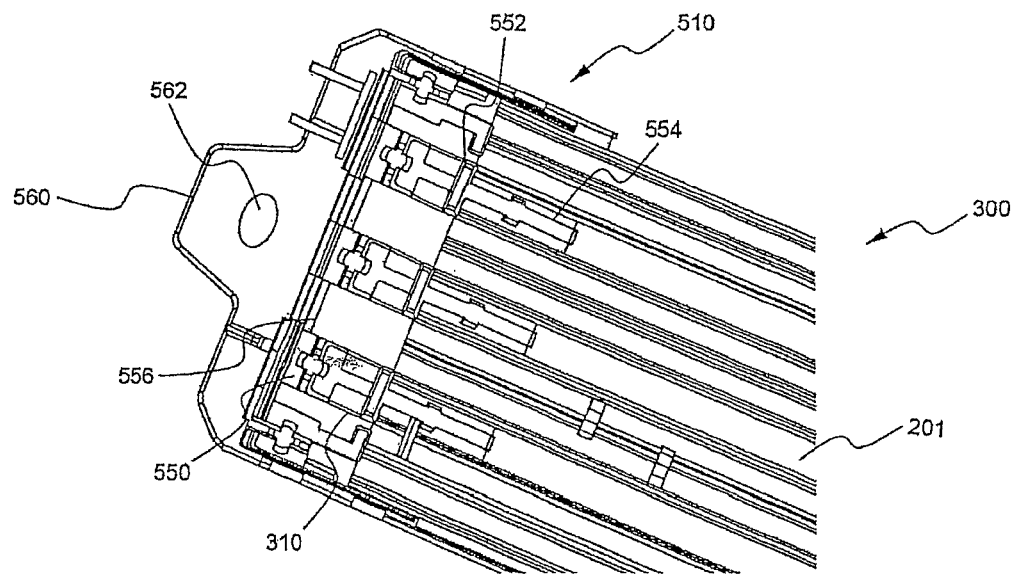
FIGS. 5 and 6 are partial plan views respectively illustrating the front and rear parts of the middle- or large-sized battery module according to the present invention when unit modules are mounted to the lower case of the middle- or large-sized battery module.
Figure 6:
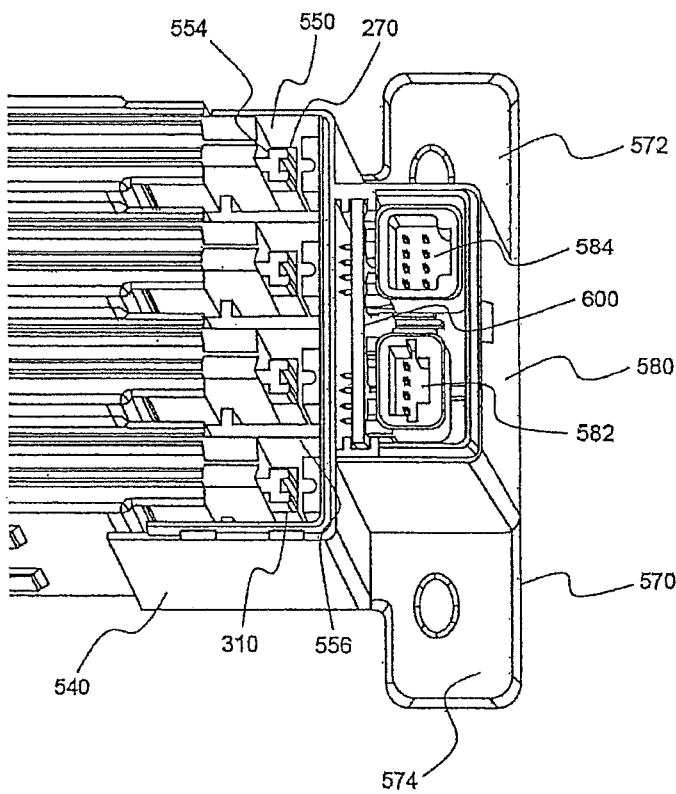
Figure 7:
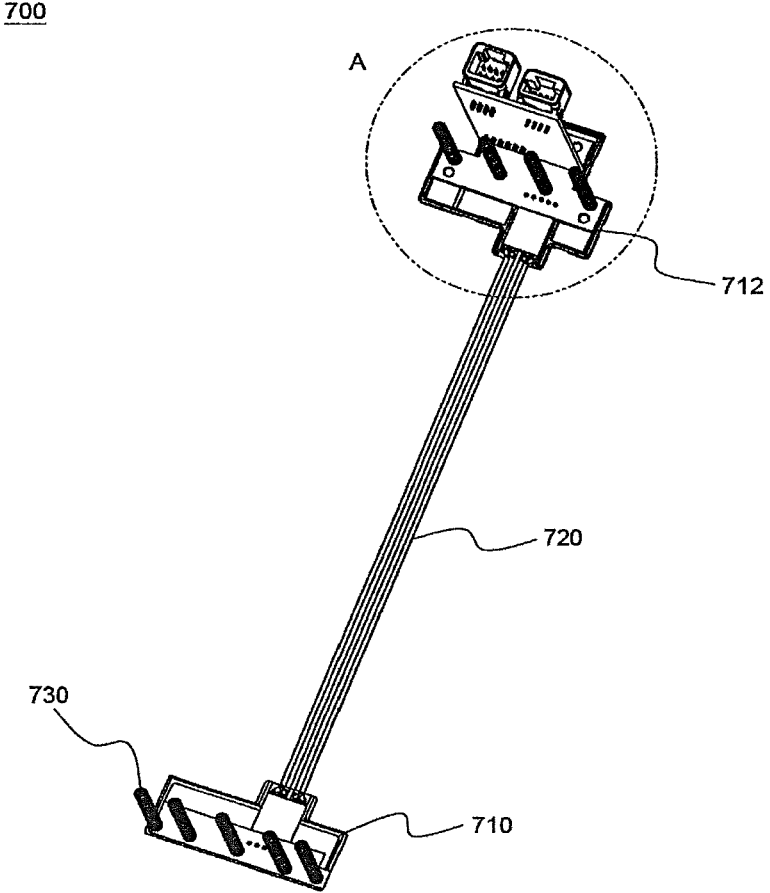
FIGS. 7 to 10 are perspective views illustrating a voltage sensing member used in the middle- or large-sized battery module according to the present invention and how to mount the voltage sensing member to the battery module.
Figure 8:
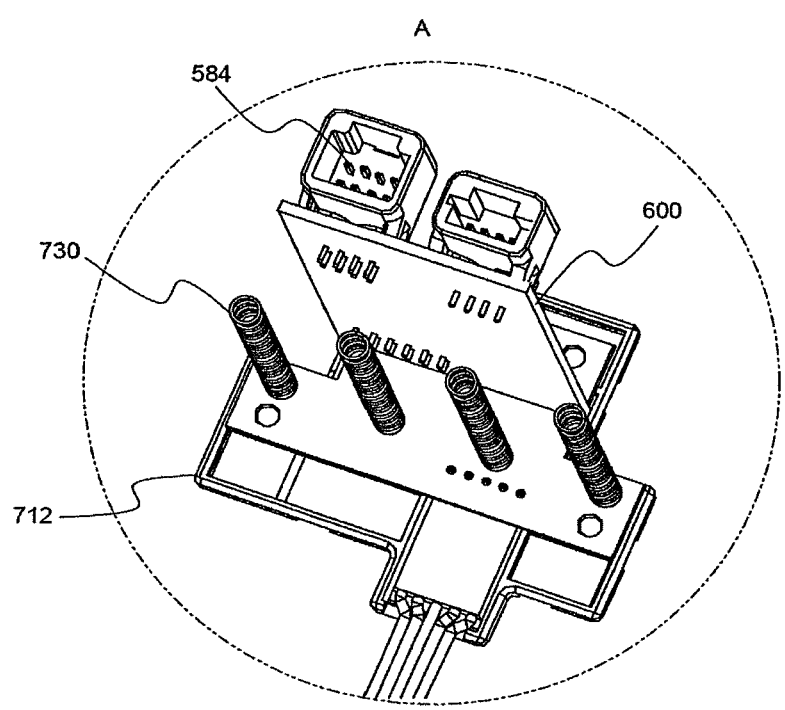
Figure 9:
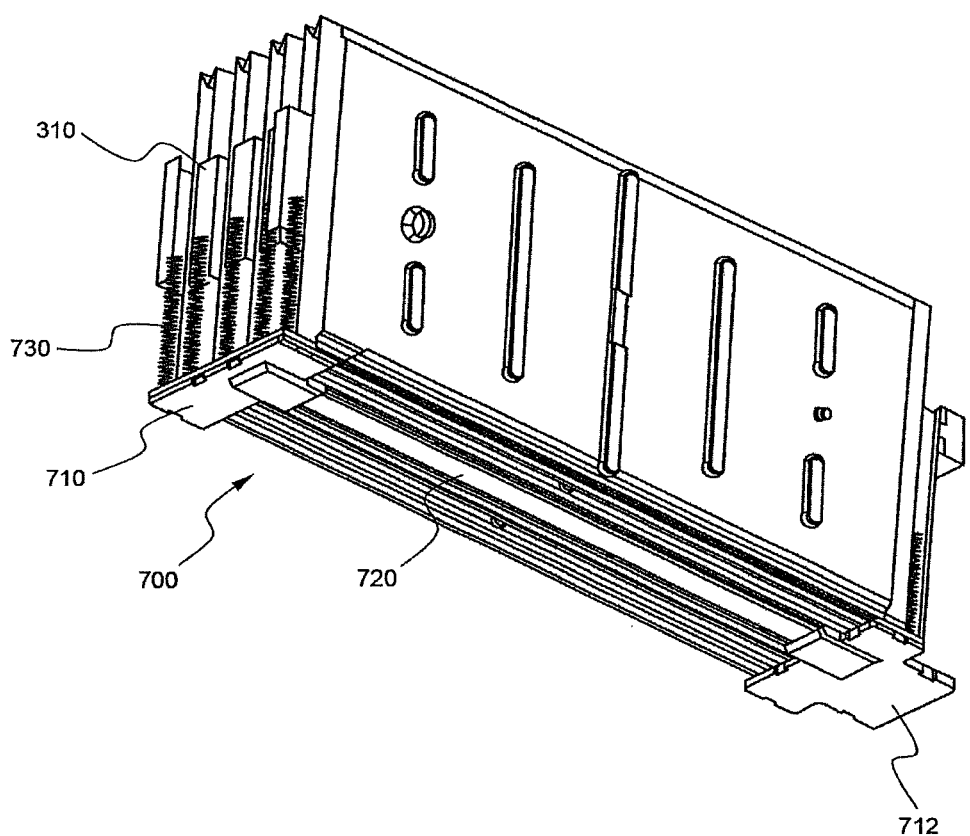
Figure 10:
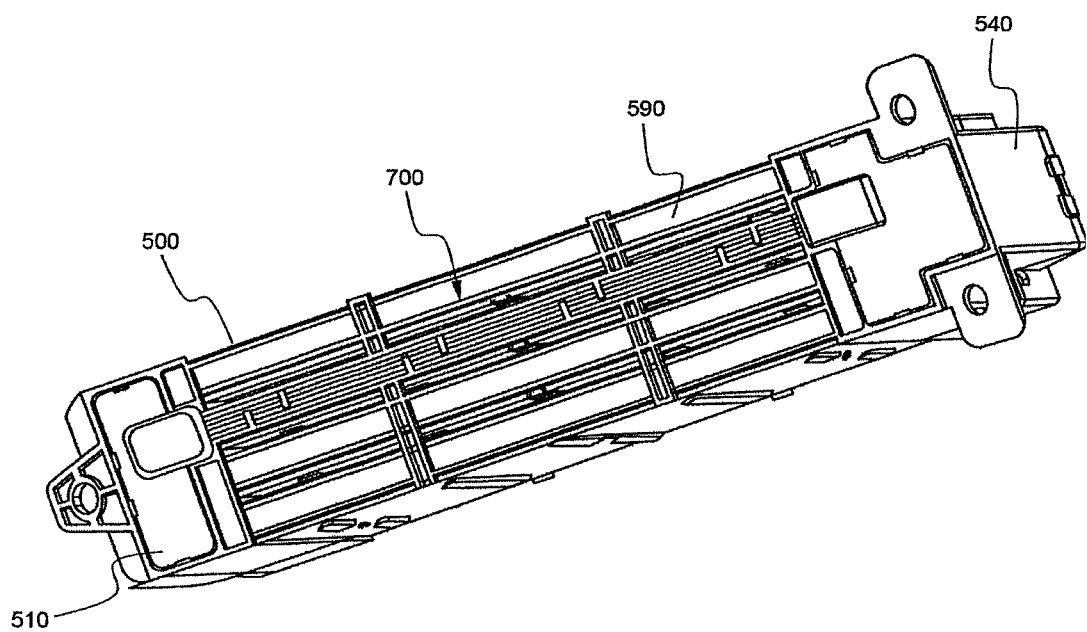

FIGS. 5 and 6 are partial plan views respectively illustrating the front and rear parts of the middle- or large-sized battery module according to the present invention when unit modules are mounted to the lower case of the middle- or large-sized battery module.

Referring to these drawings, the lower case 500 is provided at the insides of the front part 510 and the rear part 540 thereof with pluralities of fixing grooves 550 in which the electrode terminal connections 310 of the unit modules 201 and electrode terminal connections 310 of the battery cells mounted in the respective unit modules 200 are inserted. The fixing grooves 550 are formed in a shape corresponding to the electrode terminal connections 310 and 270. Consequently, the fixing grooves 550 prevent the battery cell stack 300 from moving forward and rearward and maintain stable insulation between the neighboring electrode terminal connections. Specifically, a cell cover movement preventing protrusion 552, a cell cover fixing guide 554, and an electrode terminal isolation wall 556 are formed in each fixing groove 550 for accomplishing more stable fixing and insulation of the unit modules 201.

Also, the lower case 500 is provided at the lower end of the front part thereof with a coupling part 560 which protrudes from the lower case 500 and has a through-hole 562 in the center thereof such that the lower case 500 is fixed to an external device (not shown).

Figure 12:
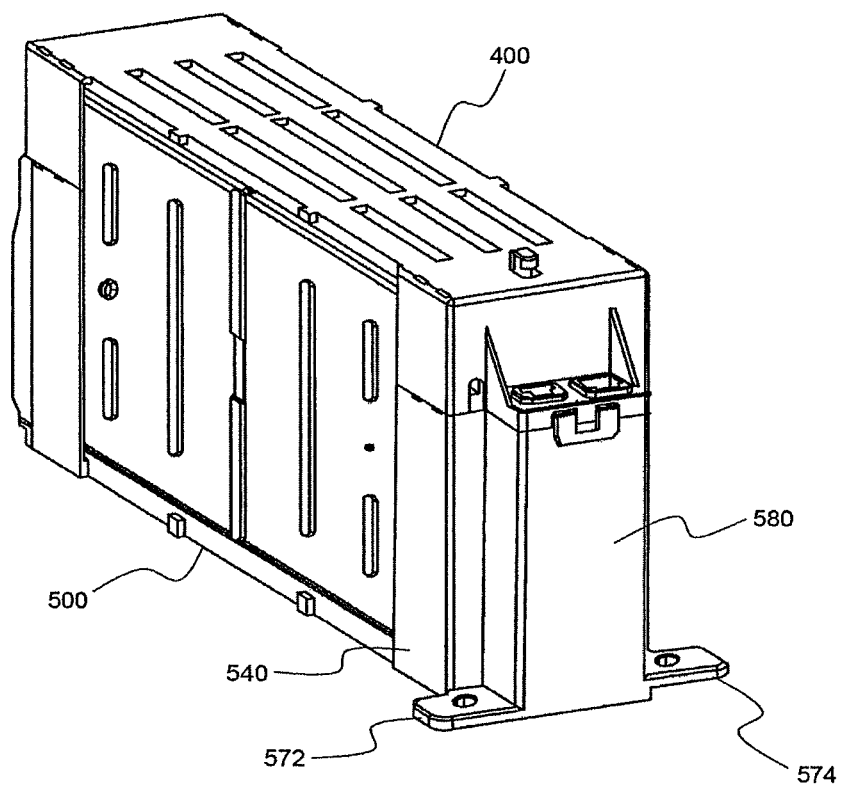

Especially, a protruding coupling part 570 formed at the lower end of the rear part of the lower case 500 includes a pair of opposite coupling parts 572 and 574. The coupling part 572 is formed such that the coupling part 572 is higher by a height equivalent to the thickness of the coupling part 574 than the coupling part 574. Consequently, when a middle- or large-sized battery system is manufactured using a plurality of battery modules, the coupling between the battery modules is easily accomplished, and the battery system is manufactured in a compact structure. The detailed structure of the protruding coupling part 570 is shown in FIG. 12.

At the rear part 540 of the lower case 500 is mounted a battery management system (BMS) 600. The BMS 600 is received in a BMS receiving part 580 integrally formed at the lower case 500. A thermistor connector 582 and a communication connector 584 are mounted at the BMS receiving part 580.

FIGS. 7 to 10 are perspective views illustrating a voltage sensing member used in the middle- or large-sized battery module according to the present invention and how to mount the voltage sensing member to the battery module.

Referring to these drawings, the voltage sensing member 700 includes a pair of supporting parts 710 and 712 mounted to the bottom of the battery module 800 at regions corresponding to the electrode terminal connections 310 of the battery cells or the unit modules, a wire-shaped conduction part 720 for electrically interconnecting the supporting parts 710 and 712, pluralities of conductive compression springs 730 each having one end fixed to the corresponding support part 710 or 712 and the other end elastically connected to the corresponding electrode terminal connection 310, a BMS 600 mounted on the rear supporting part 712, and a connector 584.

The voltage sensing member 700 with the above-described construction is mounted to the front part 510, the rear part 540, and the bottom 590 of the lower case 500 in an insertion fashion. Consequently, the battery module 800 is easily assembled and constructed in a stable structure.

Figure 11:
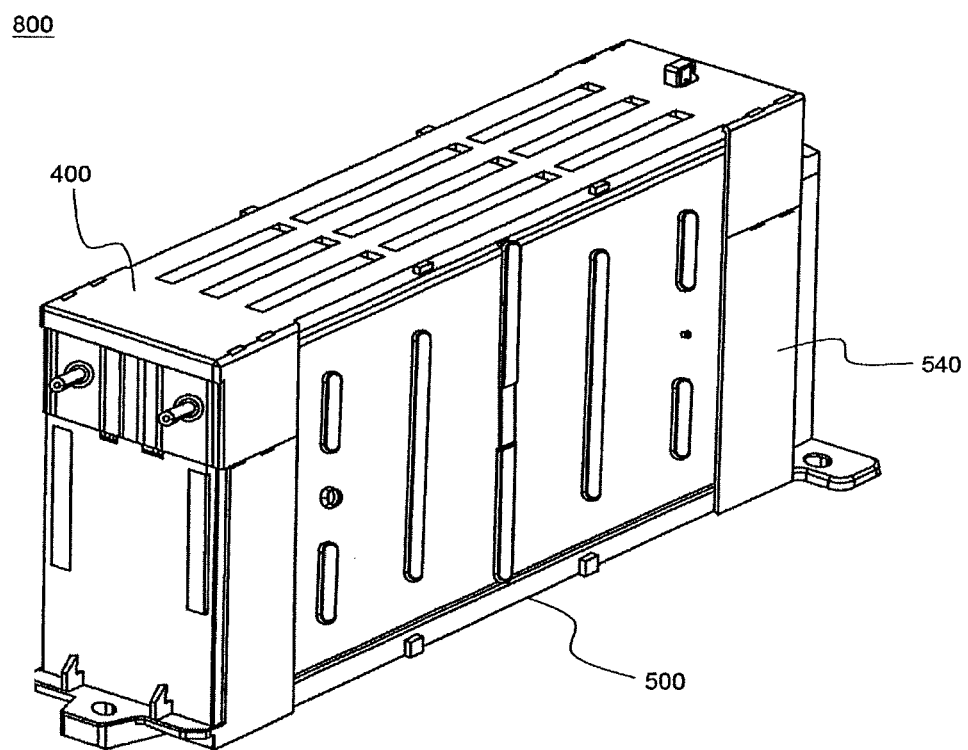
FIGS. 11 and 12 are perspective views illustrating partially assembled states of the middle- or large-sized battery module according to the present invention.

FIGS. 11 and 12 are perspective views illustrating partially assembled states of the middle- or large-sized battery module according to the present invention.

Referring to these drawings, the battery module 800 is easily assembled by the coupling between the upper and lower case 400 and 500. The BMS (not shown) is received in the BMS receiving part 580 integrally formed at the rear part 540 of the lower case 500. Consequently, the battery module 800 is constructed in a simple and compact structure. Also, two or more battery modules may be connected with each other by the coupling between the pair of coupling parts 572 and 574 formed at the lower end of the rear part 540 of the lower case 500 such that the pair of coupling parts 572 and 574 have different heights.

Figure 13:
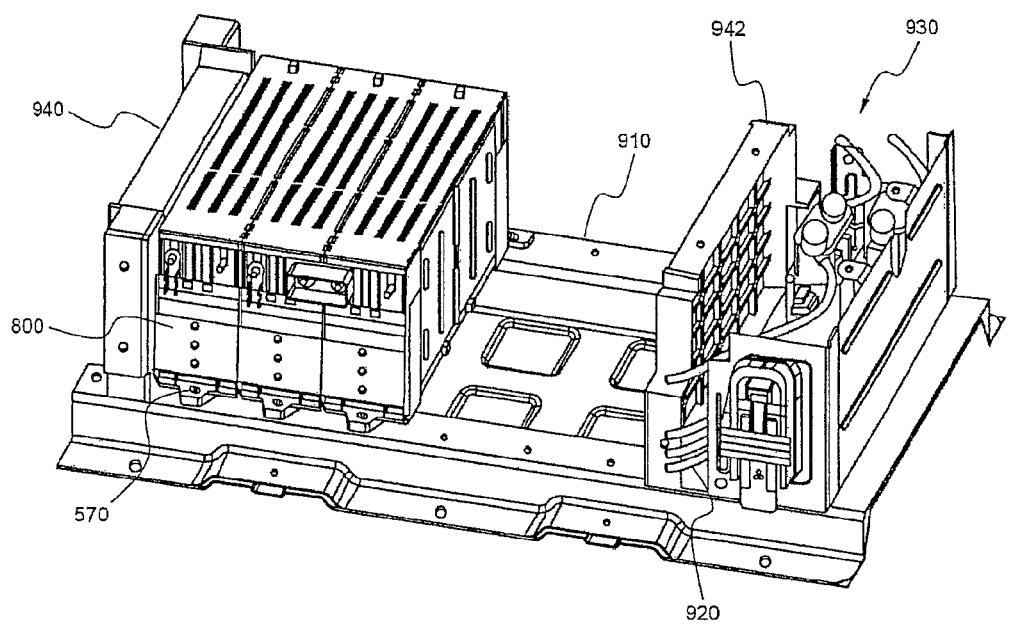
FIG. 13 is a perspective view illustrating the assembly of a middle- or large-sized battery system according to a preferred embodiment of the present invention.

FIG. 13 is a perspective view illustrating the assembly of a middle- or large-sized battery system according to a preferred embodiment of the present invention.

Referring to FIG. 13, the middle- or large-sized battery system 900 is constructed in a structure in which a plurality of battery modules 800, one of which is shown in FIG. 12, are mounted on a frame 910, and the battery modules 800 are connected to an electric/electronic subassembly 930 located at one side of the frame 910 via a power cable (partially shown) 920.

The electric/electronic subassembly 930 includes a master BMS connected to BMSs (not shown), i.e., slave BMSs, of the respective battery modules 800 for controlling the slave BMSs and various kinds of electric/electronic devices for controlling the overcharge, overdischarge, and overcurrent of the battery system 900 and input and output of power.

The battery modules 800 are stably fixed to the frame 910 by the coupling part 560 and opposite supporting members 940 and 942, and therefore, the battery system is structurally stable when external impart is applied to the battery system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the present invention has the effect of easily mounting a sensing unit that is capable of minimizing the weight and size of battery cells while effectively reinforcing the low mechanical strength of the battery cells and sensing the operation state of the battery cells to a middle- or large-sized battery module. In addition, the present invention has the effect of manufacturing the battery module by a simple assembly process without using a plurality of members for mechanical coupling and electrical connection, thereby decreasing the manufacturing costs of the battery module, and effectively preventing the battery module from being short-circuited or damaged during the manufacture or the operation of the battery module. Furthermore, the present invention has the effect of manufacturing a middle- or large-sized battery system having desired output and capacity using the battery module as a unit body.

What is claimed is:

1. A middle- or large-sized battery module comprising:
a battery cell stack including a plurality of unit modules connected in series with each other, wherein each unit module includes two or more battery cells constructed in a stacked structure in which electrode terminals of the battery cells are connected in series with each other and electrode terminal connections are bent such that the battery cells are stacked;
a first module case configured to surround a side end of the battery cell stack and to partially surround upper and lower ends of the battery cell stack, the first module case being provided at a front part thereof with external input and output terminals;
a second module case coupled with the first module case, the second module case configured to surround another side end of the battery cell stack and to partially surround the upper and lower ends of the battery cell stack, the second module case being provided at a front part thereof with bus bars for connecting electrode terminals of the battery cell stack to the external input and output terminals;
a sensing member including sensing parts mounted in spaces defined on the front part and a rear part of the second module case and a conduction part for interconnecting the sensing parts;
a battery management system mounted to the rear part of the second module case, while being connected to the sensing member, for monitoring and controlling operation of the battery module; and
a pair of high-strength cell covers for surrounding outer surfaces of the battery cells excluding the electrode terminals of the battery cells when the cell covers are coupled with each other,
wherein the battery module further comprises a front cover mounted to the front part of the second module case for protecting connections between the electrode terminals of the battery cell stack and the bus bars, the front cover being made of an insulative material,
wherein the two or more battery cells are plate-shaped battery cells having the electrode terminals formed at upper and lower ends thereof, and
wherein the first and second module cases are provided in insides thereof with pluralities of mounting grooves in which edges of the unit modules are inserted.

2. The battery module according to claim 1, wherein the cell covers are provided at outer surfaces thereof adjacent to upper and lower ends thereof with first steps of a predetermined size for easily fixing the unit modules, and the cell covers are provided at the outer surfaces thereof adjacent to opposite sides thereof with second steps of a predetermined size for easily fixing the unit modules, the mounting grooves of the first and second module cases configured to correspond with the first and second steps.

3. The battery module according to claim 1, wherein the second module case is provided at insides of the front and rear parts thereof with pluralities of fixing grooves in which the electrode terminal connections are inserted.

4. The battery module according to claim 1, wherein the second module case is provided at the front part thereof with a pair of slits through which the outermost electrode terminals of the battery cell stack are inserted.

5. The battery module according to claim 4, wherein the outermost electrode terminals of the battery cell stack are inserted through the slits and then bent such that the outermost electrode terminals are connected to the bus bars located at the front part of the second module case.

6. The battery module according to claim 1, wherein an upper end of each bus bar is formed in a shape of a depression such that the external input and output terminals provided at the front part of the first module case are inserted into the depressions of the bus bars when the first and second module cases are coupled with each other.

7. The battery module according to claim 1, further comprising:
a conductive member mounted to at least one of the external input and output terminals for fixing an upper end of the front cover and assisting with connection of a power cable necessary for electrical connection.

8. The battery module according to claim 1, wherein the front cover is coupled to the second module case in an assembly coupling fashion.

9. The battery module according to claim 1, wherein the front cover is provided with holes for fixing a power cable.

10. The battery module according to claim 1, wherein the second module case is provided at a lower end of (i) the front part thereof, (ii) the rear part thereof, or (iii) both the front and rear parts thereof with a coupling part which protrudes from the second module case and has a through-hole in a center thereof such that the second module case is fixed to an external device.

11. The battery module according to claim 10, wherein the coupling part includes a pair of protruding coupling parts constructed such that one of the protruding coupling parts is higher by a height equivalent to a thickness of the other protruding coupling part than the other protruding coupling part.

12. The battery module according to claim 1, wherein the second module case is provided at the rear part thereof with a protruding battery management system receiving part in which the battery management system is received.

13. The battery module according to claim 1, further comprising:
thermistors mounted to the unit modules of the battery cell stack, the thermistors being connected to the battery management system.

14. The battery module according to claim 12, wherein the battery management system receiving part is provided with a thermistor connector and a communication connector.

15. A middle- or large-sized battery system comprising a plurality of battery modules, wherein each battery module comprises:
a battery cell stack including a plurality of unit modules connected in series with each other, wherein each unit module includes two or more battery cells constructed in a stacked structure in which electrode terminals of the battery cells are connected in series with each other and electrode terminal connections are bent such that the battery cells are stacked;

a first module case configured to surround a side end of the battery cell stack and to partially surround upper and lower ends of the battery cell stack, the first module case being provided at a front part thereof with external input and output terminals;

a second module case coupled with the first module case, the second module case configured to surround another side end of the battery cell stack and to partially surround the upper and lower ends of the battery cell stack, the second module case being provided at a front part thereof with bus bars for connecting electrode terminals of the battery cell stack to the external input and output terminals;

a sensing member including sensing parts mounted in spaces defined on the front part and a rear part of the second module case and a conduction part for interconnecting the sensing parts;

a battery management system mounted to the rear part of the second module case, while being connected to the sensing member, for monitoring and controlling operation of the battery module; and a pair of high-strength cell covers for surrounding outer surfaces of the battery cells excluding the electrode terminals of the battery cells when the cell covers are coupled with each other, wherein the battery module further comprises a front cover mounted to the front part of the second module case for protecting connections between the electrode terminals of the battery cell stack and the bus bars, the front cover being made of an insulative material, wherein the two or more battery cells are plate-shaped battery cells having the electrode terminals formed at upper and lower ends thereof, and wherein the first and second module cases are provided in insides thereof with pluralities of mounting grooves in which edges of the unit modules are inserted.

16. An electric vehicle including the battery system according to claim 15 as a power source.

17. A hybrid electric vehicle including the battery system according to claim 15 as a power source.

* * * * *